United States Patent
Wodtke et al.

(10) Patent No.: US 8,024,196 B1
(45) Date of Patent: Sep. 20, 2011

(54) TECHNIQUES FOR CREATING AND TRANSLATING VOICE APPLICATIONS

(75) Inventors: Dirk V. Wodtke, Aptos, CA (US); Joerg Mann, Heidelberg (DE)

(73) Assignee: SAP AG, Walldorf (DE)

(*) Notice: Subject to any disclaimer, the term of this patent is extended or adjusted under 35 U.S.C. 154(b) by 1602 days.

(21) Appl. No.: 11/298,071

(22) Filed: Dec. 9, 2005

Related U.S. Application Data

(60) Provisional application No. 60/718,294, filed on Sep. 19, 2005.

(51) Int. Cl.
*G10L 21/00* (2006.01)

(52) U.S. Cl. ............. 704/277; 704/3; 704/9; 704/275; 704/270.1; 704/270; 704/260; 704/235; 381/56; 379/90.01

(58) Field of Classification Search ............. 704/9, 235, 704/275, 270, 3, 270.1, 260; 707/1; 715/765; 715/234; 705/38; 381/56; 379/90.01, 88.02
See application file for complete search history.

(56) References Cited

U.S. PATENT DOCUMENTS

| | | | | |
|---|---|---|---|---|
| 5,854,997 A * | 12/1998 | Sukeda et al. | ............. | 704/3 |
| 6,173,266 B1 * | 1/2001 | Marx et al. | ............. | 704/270 |
| 6,223,150 B1 * | 4/2001 | Duan et al. | ............. | 704/9 |
| 6,490,564 B1 * | 12/2002 | Dodrill et al. | ............. | 704/275 |
| 6,507,817 B1 * | 1/2003 | Wolfe et al. | ............. | 704/260 |
| 6,523,172 B1 * | 2/2003 | Martinez-Guerra et al. | . | 717/143 |
| 6,711,618 B1 * | 3/2004 | Danner et al. | ............. | 709/228 |
| 6,779,154 B1 * | 8/2004 | Nussbaum et al. | ............. | 715/234 |
| 6,883,015 B1 * | 4/2005 | Geen et al. | ............. | 709/203 |
| 7,027,975 B1 * | 4/2006 | Pazandak et al. | ............. | 704/9 |
| 7,289,607 B2 * | 10/2007 | Bhargava et al. | ............. | 379/88.02 |
| 2001/0037287 A1 * | 11/2001 | Broadbent et al. | ............. | 705/38 |
| 2002/0032564 A1 * | 3/2002 | Ehsani et al. | ............. | 704/235 |
| 2002/0110248 A1 * | 8/2002 | Kovales et al. | ............. | 381/56 |
| 2003/0208460 A1 * | 11/2003 | Srikant et al. | ............. | 707/1 |
| 2005/0129198 A1 * | 6/2005 | Sudhir et al. | ............. | 379/90.01 |
| 2006/0136220 A1 * | 6/2006 | Gurram et al. | ............. | 704/275 |
| 2007/0219803 A1 * | 9/2007 | Chiu et al. | ............. | 704/270.1 |
| 2009/0013275 A1 * | 1/2009 | May et al. | ............. | 715/765 |

* cited by examiner

*Primary Examiner* — Richemond Dorvil
*Assistant Examiner* — Michael Colucci
(74) *Attorney, Agent, or Firm* — Fountainhead Law Group P.C.

(57) ABSTRACT

Embodiments of the present invention include techniques for creating voice applications in different design environments and translating voice applications into any runtime environment. A set of rendering engines creates a translation layer that can convert a voice application into any runtime environment. Each rendering engine receives a voice application and converts the voice application into a runtime-specific voice description. The voice description performs the same or similar functions in the selected runtime environment as the original voice application. Voice applications from different design environments may be stored as metadata and translated through one or more steps into different runtime environments.

10 Claims, 7 Drawing Sheets

200

```
┌─────────────────────────────────────────────────────────────┐
│     Receive a Graphical Model of the Voice Application      │
│ 201                                                         │
└─────────────────────────────────────────────────────────────┘
                              │
                              ▼
┌─────────────────────────────────────────────────────────────┐
│     Convert the Graphical Model into a Metadata Representation │
│ 202                                                         │
└─────────────────────────────────────────────────────────────┘
                              │
                              ▼
┌─────────────────────────────────────────────────────────────┐
│   Parse the Metadata Representation into an Intermediate Data Structure │
│ 203                                                         │
└─────────────────────────────────────────────────────────────┘
                              │
                              ▼
┌─────────────────────────────────────────────────────────────┐
│   Translate the Intermediary Data Structure into one or more Target │
│      Metadata Representations in a Platform-Specific Format │
│ 204                                                         │
└─────────────────────────────────────────────────────────────┘
```

FIG. 2

TECHNIQUES FOR CREATING AND TRANSLATING VOICE APPLICATIONS

RELATED APPLICATIONS

This invention claims the benefit of priority from U.S. Provisional Application No. 60/718,294, filed Sep. 19, 2005, entitled "Techniques for Creating Voice Applications and Translating Voice Applications into Any Runtime Environment".

BACKGROUND

The present invention relates generally to voice applications, and more particularly, to techniques for creating voice applications using a voice application development environment, and techniques for translating voice applications into different runtime environments.

A voice application is a system that provides interactive voice dialogues. Examples of voice applications include Voice Recognition (VR) and Interactive Voice Response (IVR) communication systems. Voice applications allow a telephone caller to select an option from a spoken menu and interface with a computer system in a pre-defined way. Typically, such voice applications play pre-recorded, digitized voice prompts. The caller can respond to these prompts by pressing a key on a telephone keypad or by speaking back audible answers to the system (e.g., saying "yes" or "no").

Such voice application systems can be implemented using a variety of proprietary and open source (free) solutions that include a runtime environment. A runtime environment is a software and/or hardware system that can execute an application. A voice application can be specified using metadata, such as an XML-based markup text (e.g., VoiceXML or Visual Composer Language (VCL)). The flow of a voice application, expressed as VoiceXML or VCL, is then interpreted to generate an executable version that may be deployed within a runtime environment.

One problem with contemporary voice application systems is that they are typically proprietary. Consequently, such systems may execute voice applications only if such voice applications are expressed in the particular language of the voice system provider (i.e., in a proprietary language). As a result, conventional voice application systems do not have the flexibility to implement voice applications created using different technologies. This limits the usefulness and portability of any given voice application.

Thus, there is a need for an increased flexibility in voice applications. Embodiments of the present invention provide systems and methods that may be used for creating and translating voice applications into different runtime environments.

SUMMARY

Embodiments of the present invention enable a voice application to be used across a multiple design and/or runtime environments. Embodiments of the present invention include systems and methods that may be implemented as computer programs (software) and stored on a computer-readable medium containing instructions for controlling a computer system to perform the functions and features described herein. In one embodiment, the present invention includes a computer-implemented method for translating a voice application, the method comprising storing a voice application as a first metadata representation, and translating the first metadata representation into at least one target metadata representation, wherein the translating enables the voice application to be processed across different voice runtime environments.

In one embodiment, the first metadata representation is translated into a first target metadata representation by a first rendering engine when a user specifies a first runtime environment, and the first metadata representation is translated into a second target metadata representation by a second rendering engine when a user specifies a second runtime environment.

In one embodiment, the present invention further comprises receiving a graphical model of the voice application, and converting the graphical model into the first metadata representation.

In one embodiment, the present invention further comprises parsing the first metadata representation into an intermediate data structure, and translating the intermediate data structure into the at least one target metadata representation.

In one embodiment, the present invention further comprises storing the intermediate data structure in a repository.

In another embodiment, the present invention includes a system including software for translating a voice application, the software comprising a modeling component for providing a first metadata representation that describes a voice application, and at least one translation component for translating the first metadata representation into at least one target metadata representation, wherein the translation enables the voice application to be processed on different runtime environments.

In one embodiment, the at least one translation component comprises a parsing component for parsing the first metadata representation into an intermediate data structure, and a rendering component for translating the intermediate data structure into the at least one target metadata representation.

In another embodiment, the present invention includes a computer-implemented method for translating a voice application comprising providing a first metadata representation that describes a voice application, parsing the first metadata representation into an intermediate data structure, storing the intermediate data structure, translating the intermediate data structure into a target metadata representation, wherein the translating enables the voice application to be executed on a runtime environment corresponding to the target metadata representation.

According to one embodiment of the present invention, a voice application development environment (VADE) is provided for creating voice applications. A graphical user interface in the VADE has a set of icons that can model functions in a voice application. A user can specify a voice application by dragging and dropping the icons onto a design template and connecting them together to create a customized voice application. The VADE is user-friendly, because it allows a user to create a customized voice application using an easy-to-understand GUI without writing code.

According to another embodiment of the present invention, techniques are provided for translating voice applications into any runtime environment. A set of rendering engines creates a translation layer that can convert a voice application into a format that is compatible with a particular runtime environment. Each rendering engine receives a voice application and converts the voice application into a runtime-specific voice description. The voice description performs the same or similar functions in the selected runtime environment as the original voice application.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 2 illustrates a process for translating a voice application according to one embodiment of the present invention.

DETAILED DESCRIPTION

Described herein are techniques for translating a voice application into a voice description that can operate in any runtime-specific environment. In the following description, for purposes of explanation, numerous examples and specific details are set forth in order to provide a thorough understanding of the present invention. It will be evident, however, to one skilled in the an that the present invention as defined by the claims may include some or all of the features in these examples alone or in combination with other features described below, and may further include obvious modifications and equivalents of the features and concepts described herein.

Figure 1:
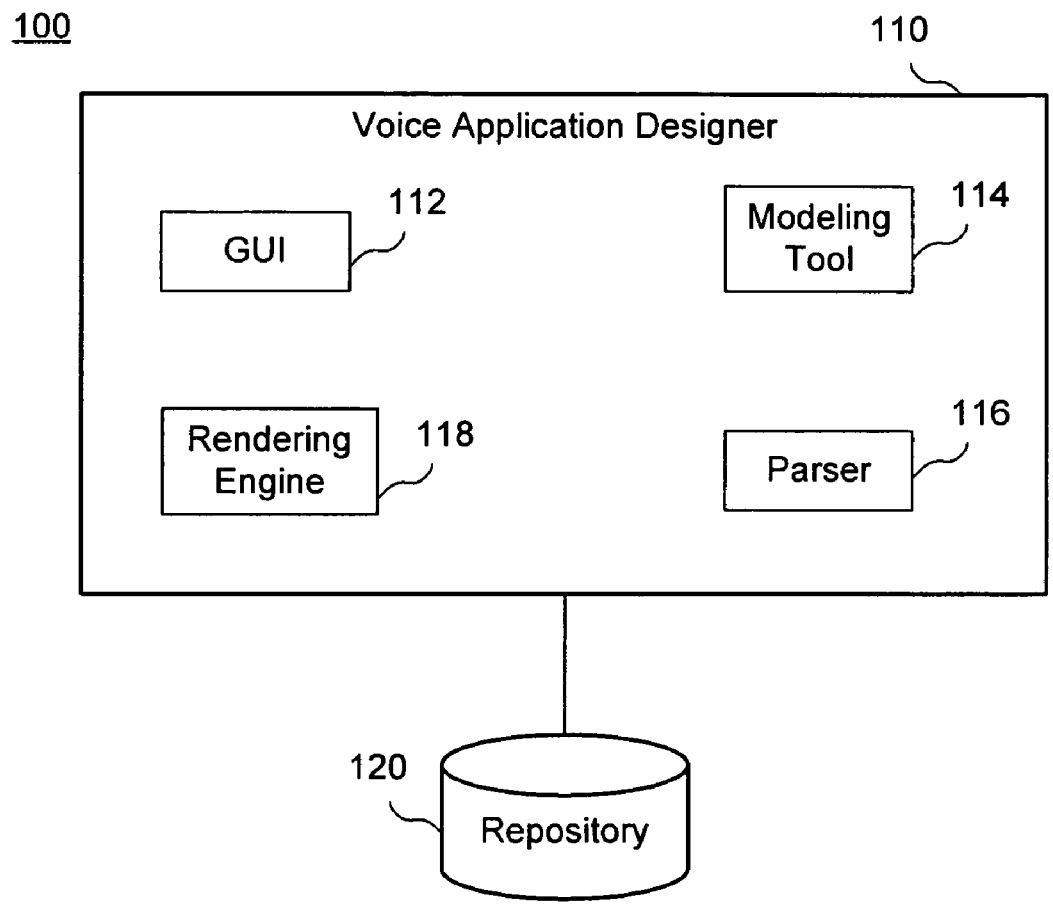
FIG. 1 illustrates a voice application system according to one embodiment of the present invention.

FIG. 1 illustrates a voice application system 100 according to one embodiment of the present invention. Embodiments of the present invention enable voice applications (i.e., a voice flow) created and specified using voice application system 100 to operate on different runtime environments by translating the voice application into different target metadata representations compatible with corresponding target runtime environments. According to one aspect of the present invention, voice application system 100 may include a voice application designer 110 (also referred to as a visual builder), which includes a graphical user interface (GUI) 112, a modeling tool 114 (also referred to as a design-time component, a Voice Integrated Development Environment ("Voice IDE") or voice application development environment ("VADE")), a parser 116, and a plurality of rendering engines 118. Voice application system 100 may also include a repository 120. The operation of voice application system 100 is described below in connection with FIG. 2.

FIG. 2 illustrates a process 200 for translating a voice application according to one embodiment of the present invention. GUI 112 of FIG. 1 provides a user with a set of icons that represent voice functions in a voice application. As described in more detail below, modeling tool 114 enables a user to design a graphical model of a voice application by dragging and dropping icons onto a design template and then connecting the icons together. At 201, the modeling tool 114 receives the graphical model of the voice application designed by the user. As described in more detail below, a user provides the graphical model by using modeling tool 114 to design the graphical model. At 202, modeling tool 114 converts the graphical model into a metadata representation that describes the voice application (i.e., voice flow). The metadata representation may or may not be in a proprietary format. In one implementation, the metadata is a textual representation (i.e., a text file) written in XML.

In one embodiment, the metadata representation may be translated directly into a format for execution in a specific runtime environment by a rendering engine 118. However, in this example, parser 116 first translates the metadata representation into an intermediate data structure at 202. The intermediate data structure that may, in turn, be translated into a platform-specific format by rendering engine 118, for example. Thus, in this embodiment, the rendering and parser components translate the metadata representation of the application into the target format. Parser 116 may optionally store the intermediate data structure in repository 120 or other location, where rendering engine 118 may later fetch the intermediate data structure. The intermediate data structure organizes the information retrieved from the metadata representation (e.g., into a standardized format). As described in more detail below, such information describes the voice application designed by the user and is organized in a manner to enable the execution and/or reconstruction of the graphical representation designed at 201. Use of an intermediate data structure has several benefits, including but not limited to the easy exchange of voice application metadata and flexible selection of both the design and runtime environment.

At 204, rendering engine 118 translates the intermediate data structure into one or more target metadata representations, which are compatible with corresponding target runtime environments. Rendering engine 118 may be referred to as a compiler, interpreter, or plugin, for example. The target metadata representation may be a textual representation (i.e., a text file) that may be written in XML, for example. Furthermore, the target metadata representation is, in one implementation, in a platform-specific format that is proprietary. However, the platform-specific format need not be proprietary.

In one implementation, the voice application is configurable. In other words, the voice application may be later modified. For example, while the voice application has basic voice components, new components from a given runtime environment may be added in order to increase the number of features that the voice application may ultimately provide. As such, embodiments of the present invention enable a user to generate a voice application that is not only flexible but also configurable.

Figure 3:
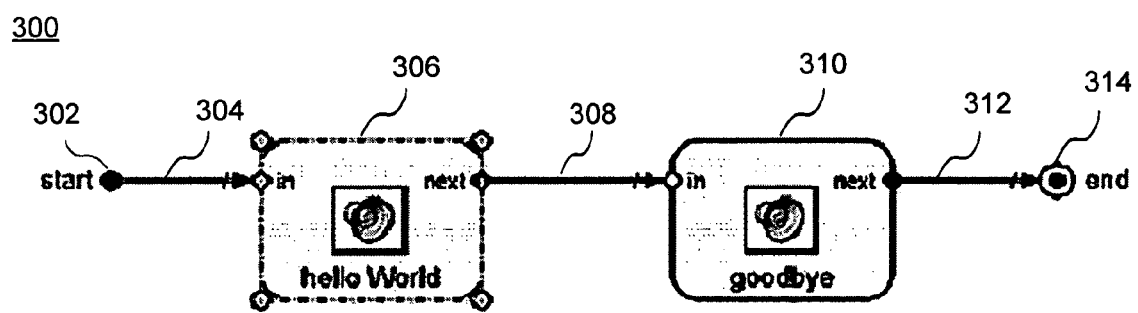
FIG. 3 illustrates an exemplary screenshot of a graphical model representing a voice application according to one embodiment of the present invention.

To more clearly illustrate the process described above in connection with FIGS. 1 and 2, the following is an example of a simple graphical model that is translated into a format that is compatible with a runtime-specific environment. FIG. 3 illustrates an exemplary screenshot of a graphical model 300 representing a voice application according to one embodiment of the present invention. A user may design graphical model 300 using any visual design time, modeling tool, or similar graphical user interface tool. As described in detail below, graphical model 300 is a result of the user dragging and dropping icons onto a design template and then connecting the icons together.

As FIG. 3 illustrates, graphical model 300 includes a start node 302, which defines a start point. A connector 304 connects start node 302 to a voice component 306. Voice component 306 models a function that conveys a message to the user. For example, the message may be "Hello World." A connector 308 connects voice component 306 to a voice component 310. Voice component 310 models a function that conveys another message to the user. For example, the message may be "Good bye." A connector 312 connects voice component 310 to an end node, which defines an end point. In this specific example, in a runtime environment, the start point may be initiated with a phone call from a caller. The system may then convey the messages described above to the caller. The system then ends the call at the end point.

Graphical model 300 describes what is referred to as a "call flow" or "voice flow." A voice flow is a sequence of steps that constitute a voice application. The Voice IDE supports the voice flow by using explicit flow control in the modeling. Connector lines between voice components on the screen symbolize the transition from one state, or object, of the voice application to another. The data "flows" implicitly with the voice flow. If an object creates data in the form of variables, these variables are visible down-stream following the flow. This principle makes the application diagram easier to read and closer to the actual execution model that takes place on the telephone.

While graphical model 300 of FIG. 3 illustrates a simple voice application, other, more complex voice flows are possible. As described above, each icon may represent a different voice component in the voice application. For example, a voice components may include a speak component, a listen component, a process component, a route component, a transfer component, a group component, and/or an access data component. The general functions that these voice components provide are as follows. The speak component enables a system to use computer generated speech or audio files to talk to a caller. The listen component enables a system to use voice recognition to obtain data from the caller. The process component enables a system to execute functions, such as JavaScript, to process user inputs or generate outputs. The route component enables a system to branch through a diagram (e.g., design template) based on conditions. The transfer component enables a system to transfer the caller to another application or agent. The group component enables a system to call a nested voice application. Finally, the access data component enables a system to perform transactions and fetch data (e.g., from a database or other system memory). Other voice components are possible and the specific voice components used will depend on the specific implementation.

After graphical model 300 is created, the modeling tool coverts graphical model 300 into a metadata representation (e.g., into an XML-based code) that describes the voice application. As described above, the metadata representation may or may not be in a proprietary format. In one implementation, the metadata representation is a textual representation (i.e., a text file) and is written in an XML-based format. The following pseudo code is one example of a metadata representation that the modeling tool may generate:

<?xml version="1.0" encoding="UTF-8"?>
    <voiceapp>
    <speak id="0002" name="hello World"
    text="Hello World and welcome to the world of voice applications.">
    <speak id="0003" name="goodbye"
    text="Have a nice day. Good bye.">
    <start id="0001"/>
    <end id="0004"/>
    <connection from="0001" to ="0002"/>
    <connection from="0002" to ="0003"/>
    <connection from="0003" to ="0004"/>
    </voiceapp>

As shown, the modeling tool transforms graphical model 300 into a metadata representation. Since the graphical modeling language is intended to abstract from the concrete voice runtime specifics, the resulting metadata representation maps loosely to the graphical model. However, the resulting metadata representation provides enough information to reconstruct the graphical model. In an actual implementation, additional metadata may be included graphical coordinates to specify where the objects appear on the screen. In one embodiment, the metadata representation may be translated (e.g., compiled or interpreted by a rendering engine) into a runtime specific format for controlling the operation of a voice engine. Different formats for controlling the operation of different voice engines may be generated using different rendering engines. In another embodiment, the metadata representation is first parsed into an intermediate data structure.

In this example, after the modeling tool converts graphical model 300 into a metadata representation, a parser translates the metadata representation into an intermediate data structure, which may be later translated into a platform-specific format. The parser may optionally store the intermediate data structure in a repository, where the rendering engine may later fetch the data structure. The data structure organizes the information extracted from the metadata representation (e.g., into a standardized format). Such information describes the voice application designed by the user and may be used to reconstruct the graphical representation designed at 201. The following pseudo code is an example of an intermediate data structure that the parser may generate:

| | |
|---|---|
| Object id | 0001 |
| Object type | Start |
| Next Object | 0002 |
| Object id | 0002 |
| Object type | Speak |
| Object name | Hello World |
| Next Object | 0003 |
| Object id | 0003 |
| Object type | Speak |
| Object name | goodbye |
| Next Object | 0004 |
| Object id | 0004 |
| Object type | End |
| Next Object | - none - |

In this specific example, the objects of the intermediate data structure are created using an object-oriented environment (e.g., Java). The intermediate data structure closely corresponds to the graphical model describe in FIG. 3. More specifically, the intermediate data structure shows objects that correspond to the voice components of graphical model 300 and the relationships of the voice components, as shown in FIG. 3. The information in the intermediate data structure may be used to create new target metadata representations that describe graphical model 300.

A rendering engine may then translate the intermediate data structure into one or more target metadata representations. The following pseudo code is an example of a target metadata representation.

<?xml version="1.0" encoding="UTF-8"?>
    <vxml version="2.1">
    <form>
      <block>
        <prompt>

```
        Hello World and welcome to the world of voice appli-
            cations.
        </prompt>
        <prompt>
            Have a nice day. Good bye
        </prompt>
    </block>
</form>
</vxml>
```

In this specific example, the target metadata representation is a textual representation (i.e., a text file) written in an XML-based code, which may be a proprietary code for the target system.

The underlying architecture is independent of different voice runtimes. Accordingly, plugging in new rendering engines corresponding to different voice runtimes does not require the user to change the voice application. In some embodiments, application specific voice runtime plug-ins may translate voice application metadata representations directly into a format for running on a particular voice engine. Using this technique, each Voice IDE would require a different plug-in for different voice runtime engines. In other embodiments, a voice application first parses the voice application metadata into an intermediate data structure, which may then be translated into a metadata representation that is compatible with the new voice runtime engine. This second approach allows users to build voice applications using different graphical design tools that store the applications in different metadata formats. Multiple different voice design tools may generate different metadata formats, which may in turn be coupled to a variety of different voice engines by first translating the design tool's metadata format into a defined intermediate data structure (i.e., using a parser), and them translating the intermediate data structure into the appropriate runtime format (i.e., using an appropriate rendering engine).

Figure 4:
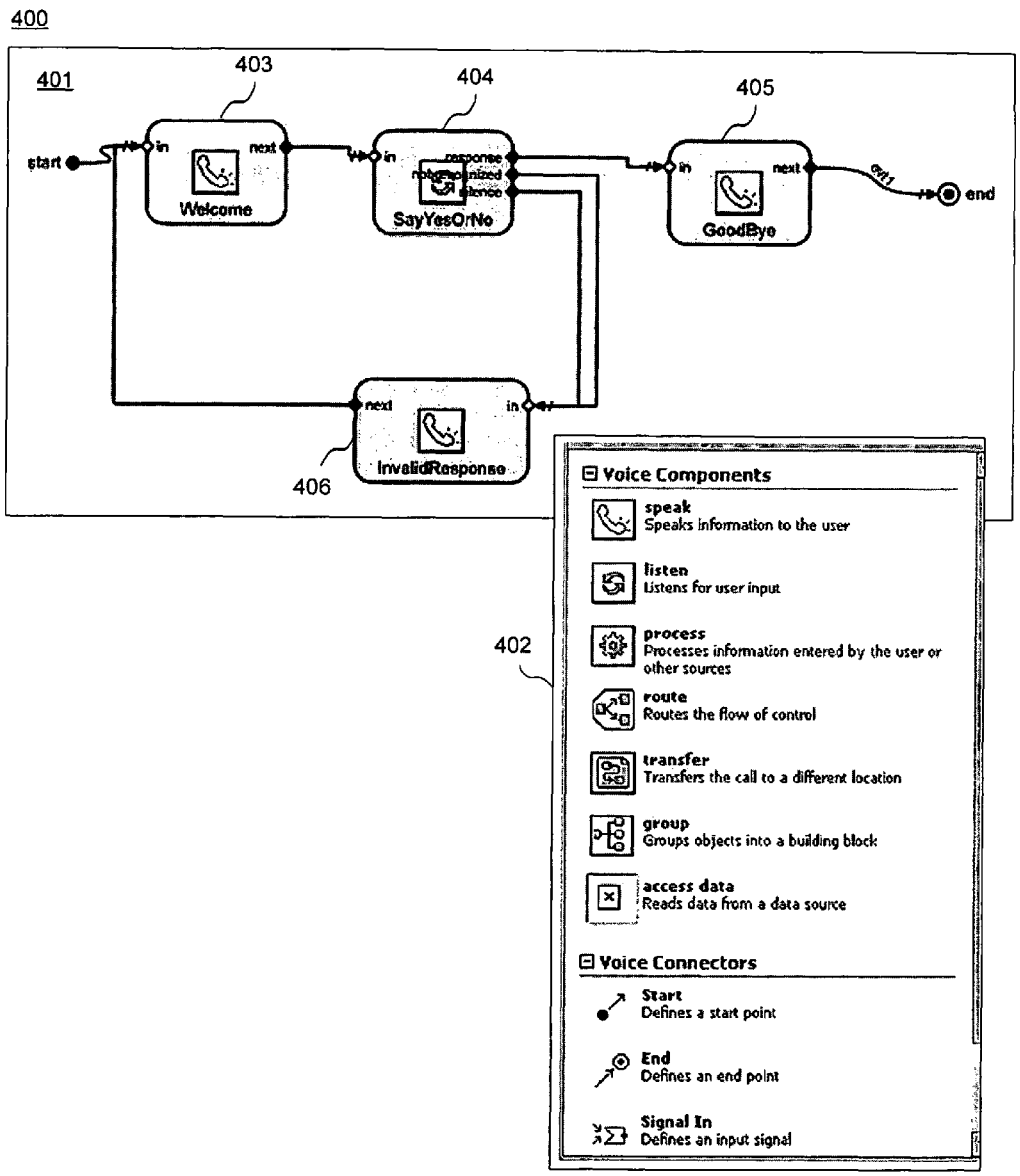
FIG. 4 illustrates a screen shot of a voice application development environment (VADE) for creating voice applications using a graphical user interface according to another embodiment of the present invention.

FIG. 4 illustrates an example of a screen shot 400 of a voice application development environment (VADE) for creating voice applications using a graphical user interface according to another embodiment of the present invention. The VADE in the example of FIG. 4 contains a design pane 401 for creating a voice application such as VoiceApp 1 as shown in screen shot 400. The VADE also contains a graphical user interface (GUI) palette 402 that provides a set of voice components and voice connectors. A user can drag and drop the voice components and voice connectors from palette 402 onto design pane 401 to create a voice application without having to write code. When components and connectors are dropped onto the design space, code is created in the background to implement the functionality modeled by the user.

In this specific example, the voice components in palette 402 may include, for example, a speak component for allowing the voice application to orally communicate information to a caller. The voice components in palette 402 may also include a listen component for listening to a voice input from the caller, and a process component for processing information entered by the caller, or other sources. The voice components in palette 402 may also include a route component that routes the flow of control, a transfer component to transfer a call to a different location or to a human actor (e.g., a call center agent), a group component that groups objects into a building block, and an access data component that writes and reads data to/from a data source.

GUI palette 402 also includes voice connectors such as a start connector that defines a start point, an end connector that defines an end point, a Signal In connector that defines an input signal, and a Signal Out connection that defines an output signal. The voice components and voice connector discussed herein are merely examples of components and connectors that can be provided by GUI palette 402. A voice application development environment (VADE) of the present invention can provide other types of components and connectors.

VoiceApp 1 in design area 401 illustrates an example of how the voice components and connectors in GUI palette 402 can be dragged and dropped to create a voice application. A start connector is created in design area 401 to define the beginning of the flow. The first step after the starting point is a speak component 403 that welcomes the caller. Speak component 403 has an input connection from the starting point and an output connection to listen component 404 that listens for input from the caller after the welcome component 403 is finished.

After input from the caller is received by listen component 404, an attempt is made to recognize the caller input. If the caller input is recognized, the flow proceeds through an output connection to an input connection in goodbye component 405, and then to an end connection. If the caller input is not recognized (or there is no response), the flow proceeds through another output connection to an invalid response component 406, and then through an output connection back to the input of component 403.

Each of the voice components 403-406 and the voice connections are created simply by dragging and dropping the GUI icons from palette 402 onto design area 401. The flow of the voice application is created by linking together the voice components in the appropriate configuration using the voice connections. A VADE of the present invention provides a user with the flexibility to easily and quickly create a voice application using intuitive GUI icons without having to write or compile code. A VADE of the present invention requires no knowledge of the complex semantics of VoiceXML or VCL.

Figure 5:
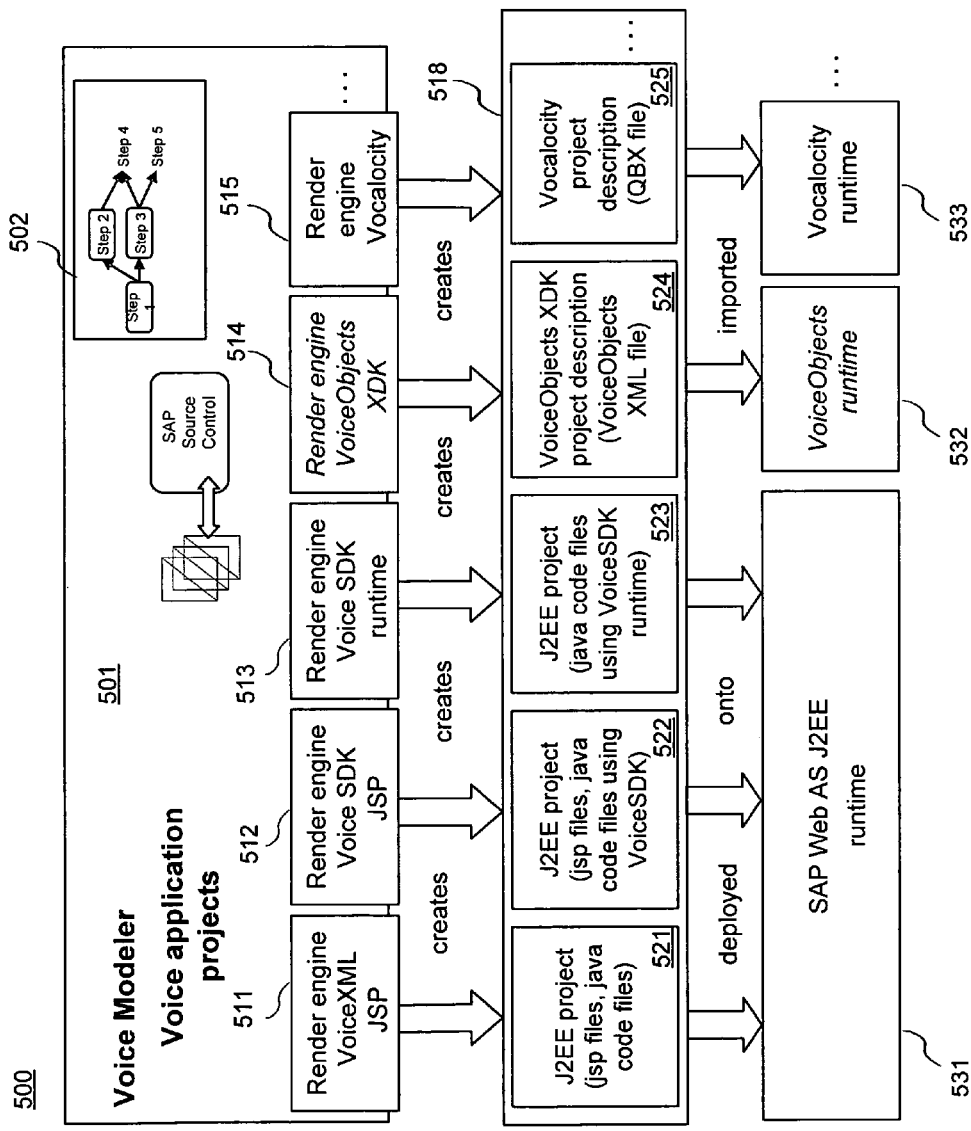
FIG. 5 is a flow chart that illustrates specific examples of rendering engines, translated voice descriptions, and runtime environments according to another embodiment of the present invention.

FIG. 5 is a flow chart 500 that illustrates examples of how specific rendering engines can translate voice applications into specific runtime environments according to another embodiment of the present invention. A voice modeler 501 such as NetWeaver Studio or a Visual Composer based builder from SAP AG, for example, is used to create voice application projects that are stored in an XML format such as VCL, for example, which is an SAP proprietary format. Voice modeler 501 is merely one example of a VADE of the present invention.

As described above, a voice application includes a set of building blocks that provide voice-related functions within a runtime environment. An example 502 of a voice application is illustrated within voice modeler 501. Voice application 502 contains a set of five steps that are connected together as shown in FIG. 5. Each step includes at least one voice protocol procedure for implementing a particular function of the voice application.

Voice modeler 501 includes an exemplary set of rendering engines 511-515 (e.g., plugins) according to embodiments of the present invention. A voice application created within voice modeler 501 can be deployed into any one of runtime environments 531-533 after being translated by a corresponding rendering engine 511-515.

The rendering engines create a set of voice descriptions 518 that can be executed in a particular runtime environment. For example, a VoiceXML JSP rendering engine 511 can translate a voice application created in voice modeler 501 into a J2EE project 521 containing JavaServer pages (JSP) files and Java code files. J2EE project 521 created by rendering engine 511 can be deployed onto and executed in an SAP J2EE application server (AS) 531.

J2EE stands for Java 2 Platform, Enterprise Edition. J2EE defines a set of standards for developing component-based multitiered enterprise applications. J2EE is also a platform for building and using web services. VoiceXML (VXML) is the XML format standard of the World Wide Web Consortium (W3C), for the development of voice applications. VoiceXML allows, for example, the creation of voice flow, speech recognition, and text-to-speech.

As another example, a VoiceSDK (Software Development Kit) JSP rendering engine 512 can translate a voice application into a J2EE project 522 that contains JSP files and Java code files using VoiceSDK. As yet another example, a VoiceSDK runtime rendering engine 513 can translate a voice application into a J2EE project 523 containing Java code files using a VoiceSDK runtime. J2EE projects 522 and 523 can also be deployed onto and executed in SAP J2EE AS 531.

As yet another example, a VoiceObjects XDK rendering engine 514 can translate a voice application into a VoiceObjects XDK project description 524 (i.e., a VoiceObjects XML file) that can be imported into and executed in a VoiceObjects runtime environment 532. As yet another example, Vocalocity rendering engine 515 can translate a voice application into a Vocalocity project description 525 (i.e., a QBX file) that can be imported into and executed in a Vocalocity runtime environment 533. VoiceObjects and Vocalocity are proprietary systems that provide runtime platforms for executing voice applications.

According to another embodiment of the present invention, a VADE provides a unique set of tools for creating a voice application. The tools can be, for example, icons expressed in a GUI that can be dragged and dropped onto a design space to create the design flow of the voice application. The set of tools provided by the VADE can be powerful enough to build any desired voice application flow. The VADE tools can be the least common denominators for creating voice applications in the sense that the tools provide low-level functionality. Preferably, the VADE tools provide enough low-level functionality that they can be built upon to create a powerful array of voice application features.

Figure 6:
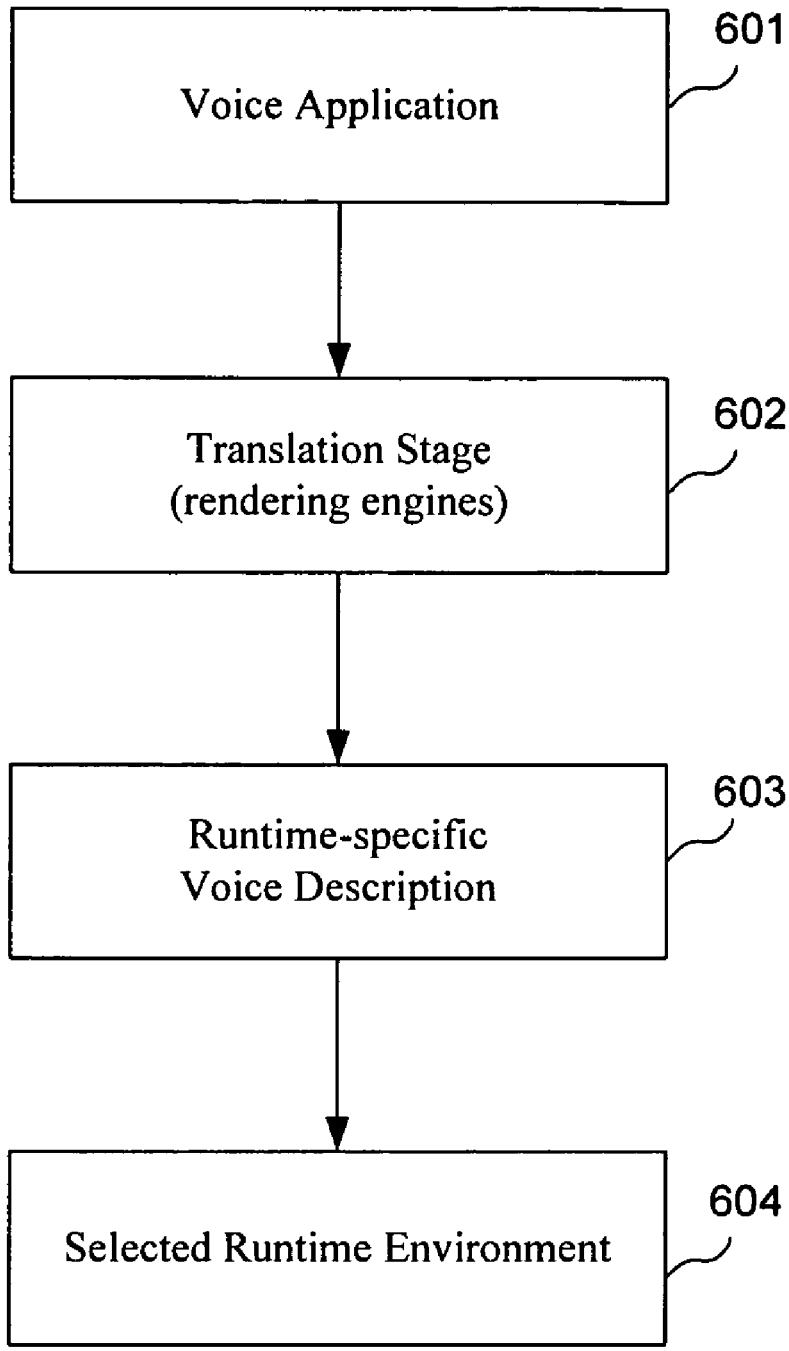
FIG. 6 illustrates the components of a system for translating a voice application into a format that is compatible with a particular runtime environment according to an embodiment of the present invention.

FIG. 6 illustrates the components of a system 600 for translating a voice application into a voice description that can operate in a particular runtime-specific environment according to an embodiment of the present invention. Initially, a voice application 601 is created using a modeling tool in a voice application development environment (VADE). A VADE is an integrated development environment (IDE) that allows a user to create the functionality and flow of a voice application.

Accordingly, in one implementation, a voice application contains a metadata description (also referred to as a metadata representation) that defines steps for implementing a voice system, such as an interactive voice response (IVR) system or a voice recognition system. For example, the metadata description can specify a set of voice prompts for an IVR that are spoken to a user. The voice prompts can describe menu options for a user to choose from.

The metadata description of the voice system may be coded in an XML-based language such as visual composer language (VCL). VCL is an XML-based markup language that is produced as the result of user generated models in an integration platform, such as SAP's NetWeaver platform, for example. NetWeaver is a runtime environment for SAP applications, and is only one example of an integration platform.

In one implementation, VADE may also provide code-free creation of composite applications via an IDE. For example, voice application 601 may be designed as a graphical model using a modeling tool. The VADE may be included as part of a design tool that facilitates the creation of content for an Enterprise Portal using a visual interface rather than manually writing code. The design tool may provide easy-to-use tools for creating portal pages and iViews that process data from back-end systems. The portal pages and iViews can be deployed to the Enterprise Portal using a standard deploy procedure. Once deployed, the pages and iViews that have been defined by VCL can now retrieve data from the Enterprise Portal and provide the information to numerous clients.

Voice application 601 is provided to a translation stage 602 of the present invention. The translation stage 602 contains a set of rendering engines. Each of the rendering engines can translate the metadata description of the voice application to generate a new or target metadata description (referred to herein as a voice description) that can be operated within a particular runtime environment. The voice description 603 may be executed in a selected runtime environment 104, selected by a user, to provide the desired voice functionality.

The rendering engine can be, for example, a plugin. A plugin is a program that is integrated into another application to provide extended functionality to the application. Translation stage plugins may be integrated into a VADE. Each plugin defines rules for parsing a voice application into a runtime environment. Also, each plugin can deploy a voice application into one particular runtime environment.

Figure 7:
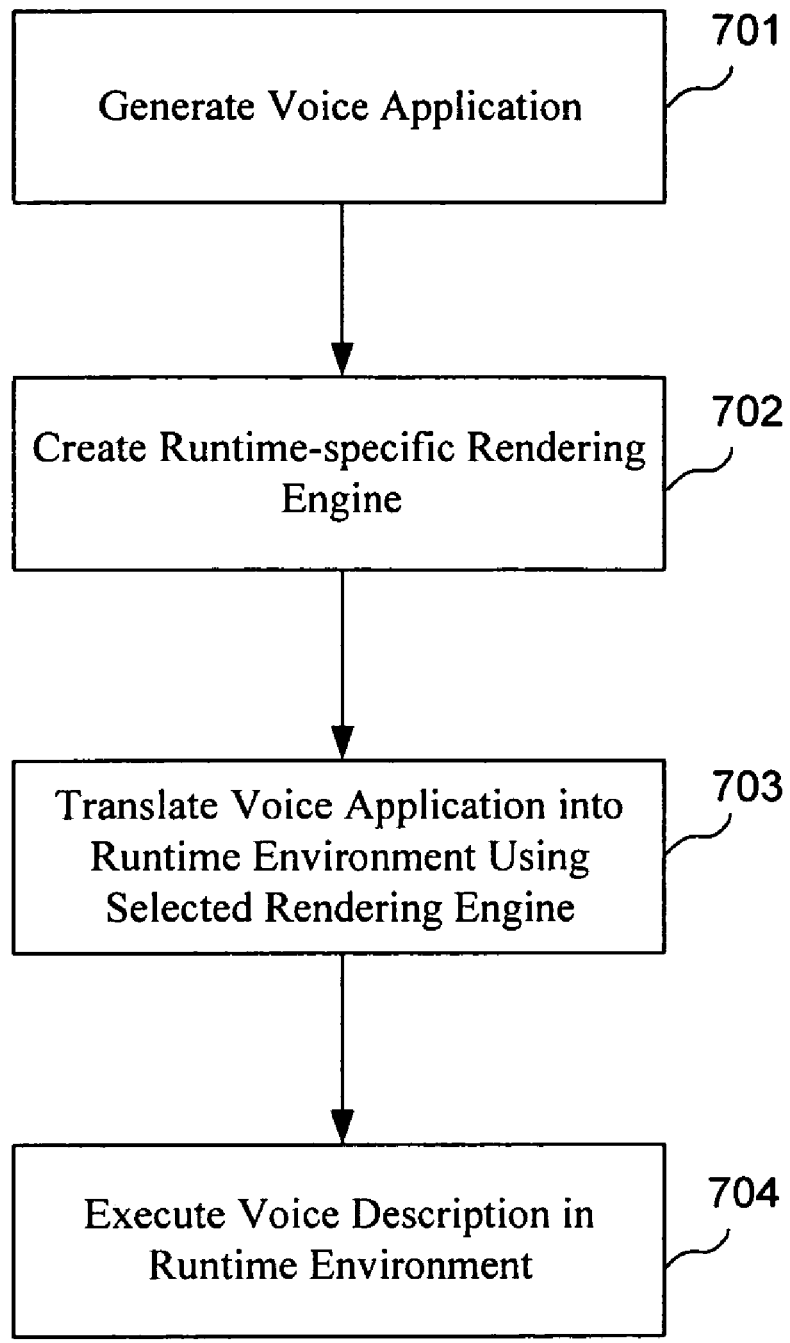
FIG. 7 is a flow chart that illustrates a process for translating a voice application into a format that is compatible with a particular runtime environment according to an embodiment of the present invention.

FIG. 7 illustrates a process 700 for translating a voice application into a format that is compatible with a particular runtime environment according to an embodiment of the present invention. At 701, a voice application is generated using a VADE. The voice application may be generated using any desired user interface (e.g., a GUI). A specific example of a VADE of the present invention is described below with respect to FIG. 4.

A translation layer 702 of the present invention includes a plurality of predefined rendering engines. Each rendering engine is designed to deploy voice applications into a specific runtime environment. However, it may be impractical to predefine rendering engines for deploying voice applications into every possible runtime environment that users may be interested in. Therefore, the present invention includes an architecture for allowing a developer to create a rendering engine (e.g., plugin) for deploying a voice application into a runtime environment that is selected by a user of the application.

FIG. 7 at 702 illustrates providing a developer with an opportunity to create a runtime-specific rendering engine using a rendering engine architecture according to one embodiment of the present invention. The rendering engine architecture allows a developer to create a rendering engine that can deploy a voice application into a user-selected runtime environment. The present invention provides a developer with the flexibility to create a rendering engine for any runtime environment so that a user is not confined to the rendering engines that have already been predefined within a VADE. 702 is an optional step, because a user may select a predefined rendering engine.

At 703, the selected rendering engine translates the voice application into a voice description that can be deployed directly into one particular runtime environment. To perform the translation, the rendering engine converts blocks of code (e.g., an XML-based textual representation) in the voice application into blocks of code in the target language of the selected runtime environment. The corresponding blocks of code form the translated or target voice description.

A translation layer of the present invention can contain several rendering engines. Each rendering engine has a defined interface that converts a voice application (e.g., defined in VCL) into a voice description that can be executed in a target runtime environment. A user can select the runtime environment, and then the translation layer can automatically translate the voice application into the selected runtime environment using the appropriate rendering engine. The present invention can also allow a user to select a particular voice gateway. A gateway may be a hardware and/or software component that generally routes phone calls and other voice transmissions. More specifically, a gateway executes VoiceXML and incorporates related technologies such as speech recognition, text-to-speech, and keypad touch-tones. In other words, a gateway translates the world of telephony into the world of the web (e.g., HTTP and XML).

A rendering engine of the present invention can translate the voice application code so that it is optimized in the selected runtime environment. The rendering engine can perform translations to create more powerful code blocks that perform the same or similar functions as the voice application. A VADE preferably contains a large set of components that allow a user to build a voice application with a variety of features. However, if the runtime environment contains features not present in the VADE, a rendering engine can take advantage of more advanced features of the target language that are not present in the language used to write the voice application.

At 704, the translated voice description is executed in the selected runtime environment. The runtime environment converts the voice description into an application that provides the desired voice functionality.

Thus, the present invention provides a runtime independent building environment that can translate a non-runtime specific voice application into any desired runtime environment using an appropriate rendering engine. The present invention also provides a rendering engine architecture that provides a developer with the flexibility to create a new rendering engine that can translate voice applications into a user-selected runtime environment.

The foregoing description of the exemplary embodiments of the invention has been presented for the purposes of illustration and description. It is not intended to be exhaustive or to limit the invention to the precise form disclosed. A latitude of modification, various changes, and substitutions are intended in the present invention. In some instances, features of the invention can be employed without a corresponding use of other features as set forth. Many modifications and variations are possible in light of the above teachings, without departing from the scope of the invention. It is intended that the scope of the invention be limited not with this detailed description, but rather by the claims appended hereto.

What is claimed is:

1. A computer-implemented method for translating a voice application, the method comprising:
   receiving, in a voice application development environment, a graphical model of the voice application, the voice application including voice components and relationships between the voice components;
   converting, in the voice application development environment, the graphical model into a first metadata representation that describes the voice application;
   parsing, in the voice application development environment, the first metadata representation into an intermediate data structure, the intermediate data structure including objects that correspond to the voice components in the voice application and the relationships between the voice components;
   storing the intermediate data structure in a repository; and
   translating, in the voice application development environment, the intermediate data structure into a first target metadata representation by a first rendering engine when a user specifies a first runtime environment, wherein the first rendering engine is a first plugin to the voice application development environment, the first rendering engine defining first rules for parsing the voice application into the first runtime environment, and translating the intermediate data structure into a second target metadata representation by a second rendering engine when the user specifies a second runtime environment, wherein the second rendering engine is a second plugin to the voice application development environment, the second rendering engine defining second rules for parsing the voice application into the second runtime environment.

2. The method of claim 1 wherein the voice application comprises one or more of a speak component, a listen component, a process component, a route component, a transfer component, a group component, or an access data component.

3. The method of claim 1 wherein the at least one target metadata representation specifies at least one runtime environment and a voice gateway.

4. A system including software for translating a voice application, the system comprising:
   a computer;
   a voice application development environment, executable on said computer, the voice application development environment comprising:
      a modeling component, executable on said computer, for receiving a graphical model of the voice application and converting the graphical model into a first metadata representation that describes the voice application, the voice application including voice components and relationships between the voice components;
      a parsing component, executable on said computer, for parsing the first metadata representation into an intermediate data structure, the intermediate data structure including objects that correspond to the voice components in the voice application and the relationships between the voice components;
      a repository, stored on a computer readable medium, for storing the intermediate data structure;
      a first rendering engine, executable on said computer, for translating the intermediate data structure into a first target metadata representation when a user specifies a first runtime environment, wherein the first rendering engine is a first plugin to the voice application development environment, the first rendering engine defining first rules for parsing the voice application into the first runtime environment; and
      a second rendering engine, executable on said computer, for translating the intermediate data structure into a second target metadata representation when a user specifies a second runtime environment, wherein the second rendering engine is a second plugin to the voice application development environment, the second rendering engine defining second rules for parsing the voice application into the second runtime environment.

5. The system of claim 4 wherein a user specifies a graphical model of the voice application by selecting and connecting voice components in a graphical user interface, and wherein the modeling component receives the graphical model of the voice application and converts the graphical model into the first metadata representation.

6. The system of claim 4 wherein the voice application comprises one or more of a speak component, a listen component, a process component, a route component, a transfer component, a group component, or an access data component.

7. The system of claim 4 wherein the at least one target metadata representation specifies at least one runtime environment and a voice gateway.

8. A non-transitory computer-readable medium containing instructions for controlling a computer system to perform a method of translating a voice application, the method comprising:

receiving, in a voice application development environment, a graphical model of the voice application, the voice application including voice components and relationships between the voice components;

converting, in the voice application development environment, the graphical model into a first metadata representation that describes the voice application;

parsing, in the voice application development environment, the first metadata representation into an intermediate data structure, the intermediate data structure including objects that correspond to the voice components in the voice application and the relationships between the voice components;

storing the intermediate data structure in a repository; and translating, in the voice application development environment, the intermediate data structure into a first target metadata representation by a first rendering engine when a user specifies a first runtime environment, wherein the first rendering engine is a first plugin to the voice application development environment, the first rendering engine defining first rules for parsing the voice application into the first runtime environment, and translating the intermediate data structure into a second target metadata representation by a second rendering engine when the user specifies a second runtime environment, wherein the second rendering engine is a second plugin to the voice application development environment, the second rendering engine defining second rules for parsing the voice application into the second runtime environment.

9. The non-transitory computer-readable medium of claim 8 wherein the voice application comprises one or more of a speak component, a listen component, a process component, a route component, a transfer component, a group component, or an access data component.

10. The non-transitory computer-readable medium of claim 8 wherein the at least one target metadata representation specifies at least one runtime environment and voice gateway.

\* \* \* \* \*